(12) United States Patent
Schweinzer et al.

(10) Patent No.: US 6,598,585 B2
(45) Date of Patent: Jul. 29, 2003

(54) VARIABLE SWIRL GENERATING INTAKE MANIFOLD WITH AT LEAST ONE LONGITUDINALLY ORIENTED PARTITION WALL

(75) Inventors: Franz Schweinzer, Graz (AT); Marko Vide, Graz (AT); Günter Gräser, Graz (AT); Reinhard Glanz, Graz (AT)

(73) Assignee: AVL List GmbH, Graz (AT)

( * ) Notice: Subject to any disclaimer, the term of this patent is extended or adjusted under 35 U.S.C. 154(b) by 13 days.

(21) Appl. No.: 10/067,807

(22) Filed: Feb. 8, 2002

(65) Prior Publication Data

US 2002/0124829 A1 Sep. 12, 2002

(30) Foreign Application Priority Data

Feb. 8, 2001 (AT) ............................................. 101/01 U

(51) Int. Cl.$^7$ ................................................. F02B 31/06
(52) U.S. Cl. ........................ 123/306; 123/308; 123/432
(58) Field of Search ................................. 123/306, 308, 123/432, 188.14

(56) References Cited

U.S. PATENT DOCUMENTS

| | | | | |
|---|---|---|---|---|
| 4,318,386 A | * | 3/1982 | Showalter et al. | 123/188.14 |
| 4,320,725 A | * | 3/1982 | Rychlik et al. | 123/188.14 |
| 4,381,743 A | | 5/1983 | Mair | |
| 5,551,392 A | * | 9/1996 | Yamaji et al. | 123/308 |
| 2003/0034005 A1 | * | 2/2003 | Ries-Mueller | 123/306 |

FOREIGN PATENT DOCUMENTS

| | | |
|---|---|---|
| DE | 3733441 | 12/1988 |
| DE | 4304892 | 4/1995 |
| EP | 0258207 | 3/1988 |
| JP | 5171960 | 7/1993 |
| JP | 00328948 | 11/2000 |
| WO | 9517589 | 6/1995 |

* cited by examiner

Primary Examiner—Erick Solis
(74) Attorney, Agent, or Firm—Dykema Gossett PLLC

(57) ABSTRACT

The invention relates to a variable swirl generating intake manifold with at least one longitudinally oriented partition wall that forms at least one swirl generating first manifold section and one swirl stopping second manifold section, said manifold sections only meeting again in the valve area, at least the second manifold section being, for the purpose of increasing the swirl, at least partially closable in the entrance area by means of a control flap that is pivotal about an axis, said axis being substantially arranged in the plane of the partition wall, said control flap having two arms and said two manifold sections being at least partially closable in a first rotational end position and open in a second rotational end position. To permit in the simplest possible way to both vary the swirl and throttle the intake charge there is provided that, for providing an increase in swirl, the control flap may be deviated from the second rotational end position toward a third end position by closing at least partially the second manifold section.

33 Claims, 3 Drawing Sheets

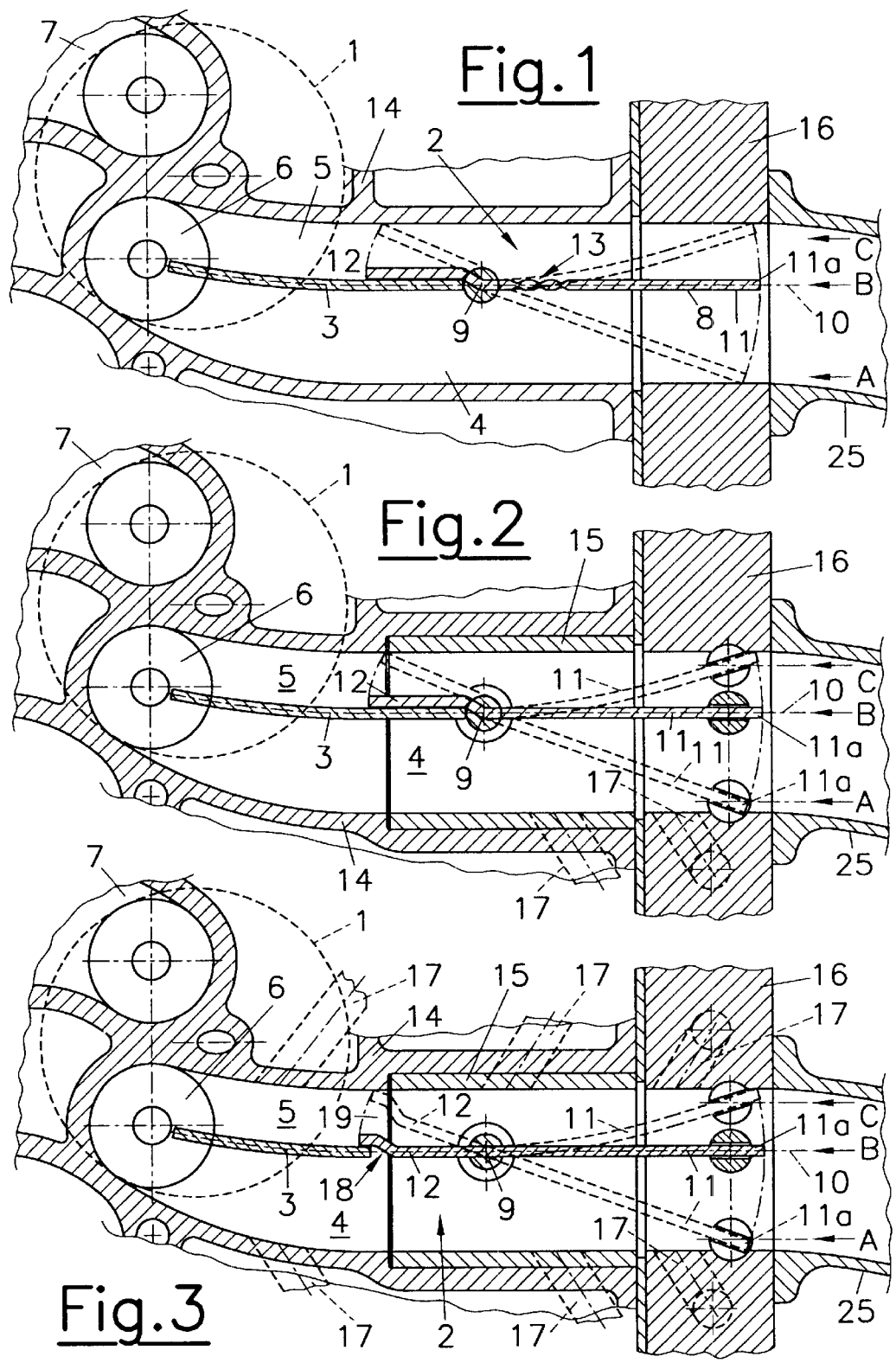

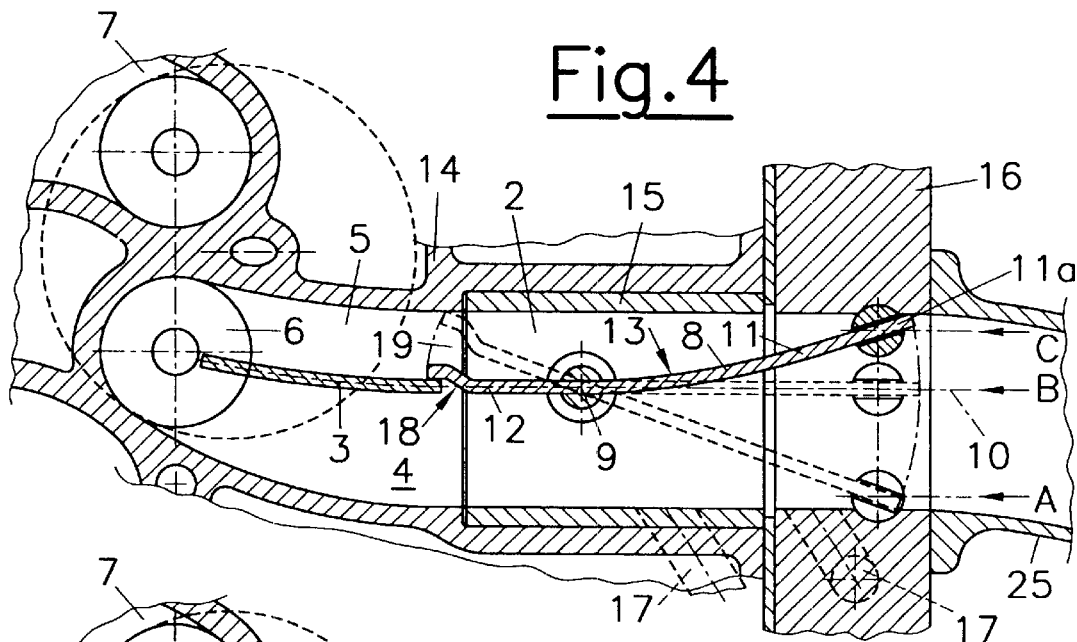
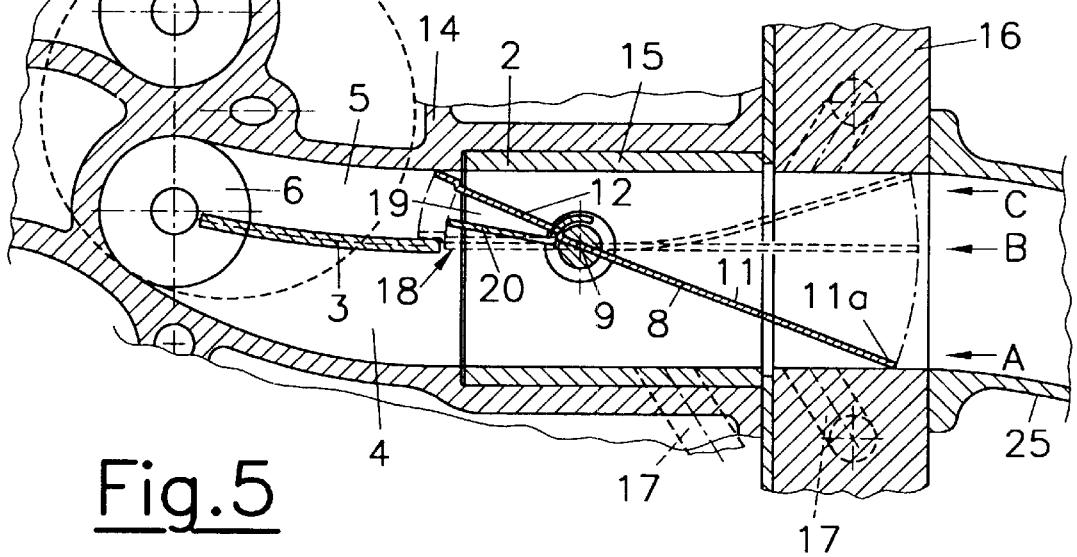

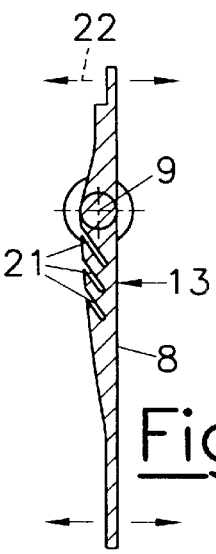
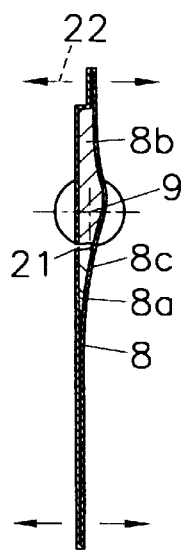
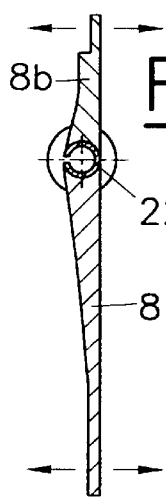
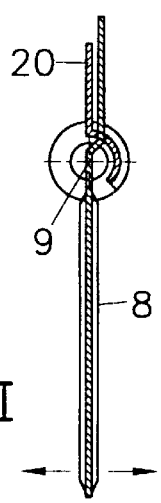
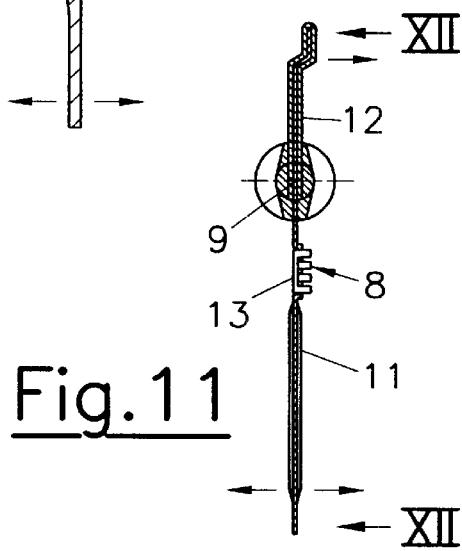
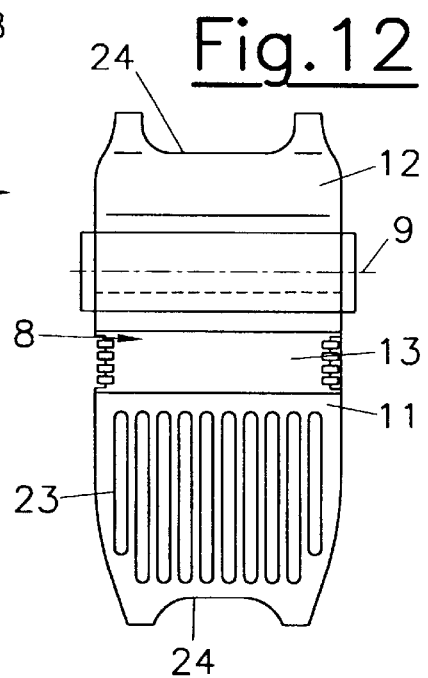

VARIABLE SWIRL GENERATING INTAKE MANIFOLD WITH AT LEAST ONE LONGITUDINALLY ORIENTED PARTITION WALL

BACKGROUND OF THE INVENTION

The invention relates to a variable swirl generating intake manifold with at least one longitudinally oriented partition wall that forms at least one swirl generating first manifold section and one swirl stopping second manifold section, said manifold sections only meeting again in the valve area, at least the second manifold section being, for the purpose of increasing the swirl, at least partially closable in the entrance area by means of a control flap that is pivotal about an axis, said axis being substantially arranged in the plane of the partition wall, said control flap having two arms and said two manifold sections being at least partially closable in a first rotational end position and open in a second rotational end position.

DESCRIPTION OF PRIOR ART

The document EP 0 258 207 B1 discloses an intake manifold for internal combustion engines with a longitudinally oriented partition wall. In order to achieve a strong enough swirl flow within the cylinder at part load on the one hand and the best possible filling of the cylinder at high speed on the other hand, the partition wall is arranged parallel to the cylinder's axis in an intake manifold that actually generates a very low swirl level. If a swirled flow is desired at part load, one manifold section is closed by a control flap. This results in an asymmetric flow through the valve into the cylinder and, through interaction with the cylinder's wall, the charge is caused to strongly rotate. In its closed condition, the flap is positioned crosswise to the flow and creates turbulence within the intake manifold. It is not possible to vary the cross-sectional area of the flow of the other intake manifold.

U.S. Pat. No. 4,381,743 discloses a variable area swirl generating inlet manifold of an internal combustion engine that is provided with a partition wall made from a thin, flexible material. The cross-sectional area of the flow path, and accordingly the swirl produced, may be varied in bending the partition wall. The flexible wall only permits to vary part of the cross-sectional area of the manifold.

The document WO 95/17589 A1 discloses a variable swirl generating intake manifold with two manifold sections that are separated by a partition wall, a control flap with two arms being realized in an effort to increase the swirl, said control flap opening the two manifold sections in a first end position and partially closing them in a second end position. The control flap is provided with a grid structure in the region of the swirl generating manifold section. Limited control of the flow path is only possible in conjunction with a variation in the swirl.

The publication JP 2000-328948 A discloses an intake control device for an internal combustion engine. An intake manifold is thereby divided into two manifold sections by means of a partition wall made from a flexible material. The inlet swirl may be regulated by bending the partition wall. The flow path is controlled by way of a conventional throttle.

The document DE 37 33 441 C1 describes a check valve arrangement in the intake manifold of a quantity controlled internal combustion engine. The intake manifold is provided with two manifold sections, spring fins for varying the flow path being arranged in each manifold section. Spring-biased curved wedges act on the spring fins and bring them into the position that closes the intake manifold when the intake valve is closed. A drawback thereof is that, to actuate the curved wedges, one spring fin and one camshaft are required for each manifold section, which increases the expenditure for installation and assembly. Another disadvantage is that, compared with a control flap, more space and more constructional modifications are needed.

SUMMARY OF THE INVENTION

It is the object of the invention to permit in the simplest possible way to both vary the swirl and control the flow path.

This is achieved in accordance with the invention in that, for providing an increase in swirl, the control flap may be deviated from the second rotational end position toward a third end position by closing at least partially the second manifold section.

It is particularly advantageous when the control flap may be deviated from the second rotational end position toward the third end position in an elastic manner, preferably by bending. To increase the swirl, the control flap is thereby bent into the third end position, the second manifold section being substantially closed. The essential point is that the deformation of the control flap in the direction of the variation in swirl may be performed exerting as little force as possible. To achieve this, it is advantageous to have the control flap provided with a predetermined bending point preferably located in the neighborhood of the axis, said predetermined bending point being preferably formed by definingly thinning the material. When actuated in the opposite direction, i.e., in the direction of the second rotational end position, in order to reduce the swirl, the control flap should exhibit highest possible rigidity. For this purpose, there is preferably provided that, starting from the second rotational end position, the control flap is less resistant to deflection in the direction of the third end position than in the direction of the first rotational end position. To provide the control flap with a direction dependent deflection resistance, the control flap may be convex curved preferably toward the side of the first manifold section. The predetermined bending point itself can be formed by locally thinning the material. It is particularly advantageous when the predetermined bending point is formed by at least one slot moulded in the control flap to the side of the first manifold section, said slot being oriented substantially parallel to the axis. By virtue of the slot in the control flap, said control flap is more resistant to deflection when caused to move in the direction of the slotted side than when caused to move in the opposite direction.

In a particularly preferred variant of the invention, the control flap is bipartite and it is preferred that the two parts of the bipartite control flap be elastically connected together. The two parts of the control flap may also at least partially be encased, the elastic casing joining the two parts together.

In another variant of the invention there is provided that the two parts are joined together in the region of the axis by means of an axial spring element. Without departing from the scope of the invention there may furthermore be provided that the first flap arm, which is arranged upstream from the axis, is larger than the second flap arm arranged downstream of the axis, the rotational movement of the control flap in the second rotational end position being preferably limited by a stop and the second flap arm preferably abutting on the partition wall.

More specifically in internal combustion engines in which one exhaust gas recirculation manifold discharges into every intake manifold it is advantageous when, between axis and partition wall, a blow-by is realized between the first and the second manifold section, said blow-by being at least mainly closed in the second rotational end position of the control flap by way of preferably the second flap arm. Accordingly, the blow-by may be controlled by the second flap arm. A particularly high flexibility in controlling the intake manifold may be achieved when the blow-by, in the first rotational end position of the control flap, may be closed by a flap element that is actuable independent of the control flap. In this manner, the blow-by can be actuated largely independent of the control flap when the control flap is in the first rotational end position.

The actuation of the control flap can be substantially simplified when a restoring force, which is preferably produced by a return spring, is applied onto the control flap in the direction of the second rotational end position.

The control flap itself may be made from a temperature resistant plastic, such as carbon fiber reinforced plastic for example, or from steel plate like e.g., spring steel, or from a sheet steel-plastic composite material.

To still permit a residual flow to pass through the intake manifold when the control flap is in the first rotational end position, said control flap is provided, at least in the region of one flap arm, with a leakage port or with a leakage recess.

The actuation device for the control flap may be electromechanical, electrohydraulic, electropneumatic, electromagnetic or have a bimetal element and one actuation device can be provided either for each of the intake manifolds or for a group of intake manifolds.

BRIEF DESCRIPTION OF THE DRAWING

The invention is explained in greater detail hereinafter with reference to the drawings.

FIGS. 1 through 5 are sectional views of intake manifolds according to the invention in various variants, FIGS. 6 through 11 illustrate control flaps in various variants and FIG. 12 is a view of the control flap of FIG. 11 taken along the line XII—XII of FIG. 11.

DETAILED DESCRIPTION OF THE PREFERRED EMBODIMENTS

In the variants of the invention, like parts will bear the same reference numerals throughout the FIGS.

In an intake manifold 2 leading to a cylinder 1 of an internal combustion engine there is arranged a partition wall 3 that is longitudinally oriented and divides the intake manifold 2 into a swirl generating first manifold section 4 and a swirl stopping second manifold section 5. The two manifold sections 4, 5 only meet again in the region of the valves 6. An exhaust manifold is labelled with the numeral 7.

A control flap 8, which is pivotal about an axis 9, is arranged in the intake manifold 2 upstream of the partition wall 3. The axis 9 is arranged substantially in the plane 10 of partition wall 3. The control flap 8 consists of a first flap arm 11 facing the flow and of a second flap arm 12 turned away from the flow, the first flap arm 11 being longer than the second flap arm 12. Control flap 8 has a first rotational end position A in which the first manifold section 4 is closed by the first flap arm 11 and the second manifold section 5 is closed by the second flap arm 12. In a second rotational end position B, the two manifold sections 4, 5 are open. Through elastic deformation the first flap arm 11 of control flap 8 may be brought beyond the second rotational end position B into a third end position C. The first rotational end position A and the third end position C are each indicated in the Figures by means of dashed lines. To make bending possible, a predetermined bending point 13 is provided on the first flap arm 11, as can be seen in FIG. 1. In the embodiment shown in FIG. 1, the control flap 8 is integrated in the intake manifold 2 directly into the cylinder head 14.

FIG. 2 represents another variant in which the control flap 8 is arranged in a housing portion 15 of its own which is inserted within the intake manifold 2. It is also possible to incorporate the control flap 8 in an intermediate flange 16 between suction pipe 25 and intake manifold 2. An exhaust gas recirculation line 17 discharges in the first manifold section 4 downstream of the upstream flap end 11a of the first flap arm 11. The exhaust gas recirculation line 17 can be arranged either in the cylinder head 14 or in the intermediate flange 16, as indicated by dashed lines.

In the variant illustrated in FIG. 3, a blow-by 18 between the two manifold sections 4, 5 is realized between the axis 9 of control flap 8 and partition wall 3, said blow-by being easy to form in positioning the axis 9 in spaced relationship from partition wall 3. Blow-by 18 is closed by the second flap arm 12 in the second rotational end position B and in the third end position C of control flap 8. However, when, for intake throttling, the control flap 8 is in the first rotational end position A, a quite large connecting gap 19 opens between the two manifold sections 4, 5. The connecting gap 19 permits to distribute the exhaust gas delivered to the partial flows of the two manifold sections 4, 5 with the corresponding effects with regard to mixture and charge stratification. The exhaust gas recirculation lines 17 may thereby discharge into various locations of the intake manifold 2 or of the two manifold sections 4, 5 respectively. The location of the discharge orifice of the exhaust gas recirculation 17 substantially influences the effects of mixture and charge stratification. The diverse possibilities to arrange one or several exhaust gas recirculation lines 17 is indicated in dashed line in FIG. 3.

FIG. 4 shows the control flap 8 of the variant illustrated in FIG. 3 in the third end position C in which the flow path is opened by the first manifold section 4 and closed by the second manifold section 5. Accordingly, an asymmetric flow reaches the entrance area 6 of intake manifold 2, which results in a swirled inlet flow into cylinder 1.

FIG. 5 shows another variant in which there is provided, in addition to control flap 8, an additional flap element 20 for separately controlling the connecting gap 19 of blow-by 18. The flap element 20 is thereby pivotal about axis 9 and may be moved substantially independent of control flap 8.

The FIGS. 6 through 12 show various variants of control flap 8. FIG. 6 illustrates a control flap 8 made from a solid material. In forming control flap 8 in such a manner that it is convex curved in the direction of the first manifold section 4, differential, direction dependent deflection resistances may be realized. Starting from the second rotational end position B, the deflection resistance in the direction of the first rotational end position A is greater than in the direction of the third end position C.

FIG. 7 shows a control flap 8 that is provided, in the region of the predetermined bending point 13, with slots 21 which are arranged to the side of the first manifold section 4 so as to be approximately parallel to the axis 9. These slots 21 permit to achieve the direction dependent deflection resistance. To move control flap 8 from the first rotational end position A back to the second rotational end position B, a restoring force 22 produced by a return spring is needed.

FIG. 8 shows another variant of a control flap 8. Control flap 8 is hereby realized in two parts indicated at 8a, 8b. The two parts 8a, 8b of control flap 8 are partially encased by an elastic material. The casing is indicated at 8c. Casing 8c is recessed on the side of the first manifold section 4, a slot 21 being formed as a result thereof. Like in FIG. 7, a directional deflection resistance can thus be generated.

FIG. 9 shows another variant of a bipartite control flap 8. The two parts 8a, 8b of control flap 8 are connected together by an axial spring element 22.

FIG. 10 shows the control flap of FIG. 5, a separate flap element 20 that is pivotal about axis 9 being provided.

The FIGS. 11 and 12 show a variant of a control flap 8 made from spring steel and provided with stiffening ribs 23 that are oriented transversely to the axis 9. A predetermined bending area 13 is left without stiffening.

The control flap 8 can be made from temperature resistant plastic, e.g., carbon fiber reinforced plastic, or from steel plate, or from a sheet steel-plastic composite material. As can be surveyed from FIG. 12, the first flap arm 11 and/or the second flap arm 12 is provided with a leakage recess 24 in an effort to allow, in the first rotational end position A or in the third end position C, residual cross-sectional areas for minimum flow paths that meet the operational requirements of the internal combustion engine. Control flap 8 may be actuated by an electromechanical, an electrohydraulic, an electropneumatic, an electromagnetic actuation device or by an actuation device with bimetal element. One actuation device may thereby be provided for either each intake manifold 2 or for a group of intake manifolds.

By virtue of the intake manifold 2 described, one single control flap 8 suffices to both vary the swirl and throttle the intake in a simple manner.

What is claimed is:

1. A variable swirl generating intake manifold with at least one longitudinally oriented partition wall that forms at least one swirl generating first manifold section and one swirl stopping second manifold section, said manifold sections only meeting again in the valve area, at least the second manifold section being, for the purpose of increasing the swirl, at least partially closable in the entrance area by means of a control flap that is pivotal about an axis, said axis being substantially arranged in the plane of the partition wall, said control flap having two arms and said two manifold sections being at least partially closable in a first rotational end position and open in a second rotational end position, wherein, for providing an increase in swirl, the control flap may be deviated from the second rotational end position toward a third end position by closing at least partially the second manifold section.

2. The intake manifold of claim 1, wherein the control flap may be deviated from the second rotational end position toward the third end position in an elastic manner.

3. The intake manifold of claim 1, wherein the control flap is inherently bendable and may be deviated toward the third end position by bending.

4. The intake manifold of claim 3, wherein the control flap is provided with a predetermined bending point.

5. The intake manifold of claim 4, wherein the benging point is located in the neighborhood of the axis.

6. The intake manifold of claim 4, wherein the predetermined bending point is formed by definingly thinning the material at that place.

7. The intake manifold of claim 4, wherein the predetermined bending point is formed by at least one slot formed in the control flap to the side of the first manifold section, said slot being oriented substantially parallel to the axis.

8. The intake manifold of claim 1, wherein, starting from the second rotational end position, the control flap is less resistant to deflection in the direction of the third end position than in the direction of the first rotational end position.

9. The intake manifold of claim 8, wherein the control flap is convex curved.

10. The intake manifold of claim 9, wherein the control flap is convex curved toward the side of the first manifold section.

11. The intake manifold of claim 1, wherein the first flap arm is provided, upstream of the predetermined bending point, with stiffening ribs that are oriented approximately normal to the axis.

12. The intake manifold of claim 11, wherein the stiffening ribs are moulded.

13. The intake manifold of claim 12, wherein the two parts of the bipartite control flap are elastically connected together.

14. The intake manifold of claim 13, wherein the two parts are joined together in the region of the axis by means of an axial spring element.

15. The intake manifold of claim 1, wherein the first flap arm, which is arranged upstream from the axis, is larger than the second flap arm arranged downstream of the axis.

16. The intake manifold of claim 1, wherein the rotational movement of the control flap in the second rotational end position is limited by a stop.

17. The intake manifold of claim 16, wherein the second flap arm is abutting on the partition wall.

18. The intake manifold of claim 17, wherein the two parts are at least partially connected together by a casing made from elastic material.

19. The intake manifold of claim 1, wherein the control flap is bipartite.

20. The intake manifold of claim 1, wherein the control flap is intrinsically articulated.

21. The intake manifold of claim 1, wherein between axis and partition wall, a blow-by is realized between the first and the second manifold section.

22. The intake manifold of claim 21, wherein said blow-by may be at least mainly closed in the second rotational end position of the control flap by way of the second flap arm.

23. The intake manifold of claim 22, wherein the blow-by, in the first rotational end position of the control flap, may be closed by a flap element that is actuable largely independent of the control flap.

24. The intake manifold of claim 1, wherein a restoring force is applied onto the control flap in the direction of the second rotational end position.

25. The intake manifold of claim 24, wherein the restoring force is produced by a return spring.

26. The intake manifold of claim 1, wherein the control flap is provided with a leakage port or with a leakage recess in the region of one flap arm.

27. The intake manifold of claim 1, wherein the control flap is at least partially made from spring steel.

28. The intake manifold of claim 1, wherein the control flap is made, at least partially, from a temperature resistant plastic.

29. The intake manifold of claim 28, wherein the control flap is made from carbon fiber reinforced plastic.

30. The intake manifold of claim 1, wherein the control flap or the flap element is operable by way of one actuation device out of the group electromechanical, electrohydraulic, electropneumatic or electromagnetic actuation device.

31. The intake manifold of claim 1, wherein the control flap or the flap element is operable by way of an actuation device that is provided with a element.

32. The intake manifold of claim 1, wherein one actuation device is provided for each of the intake manifolds.

33. The intake manifold of claim 1, wherein one actuation device is provided for a group of intake manifolds.

* * * * *